United States Patent
Ikeda et al.

(10) Patent No.: US 9,029,721 B2
(45) Date of Patent: May 12, 2015

(54) CONTROLLER WITH TRANSFORMABLE SURFACE TOPOLOGY

(75) Inventors: John Ikeda, Seattle, WA (US); Edward Owen, Redmond, WA (US); Peter Bristol, Shoreline, WA (US); Ingrid Lin, Seattle, WA (US); Michael Vilhauer, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1115 days.

(21) Appl. No.: 12/973,016

(22) Filed: Dec. 20, 2010

(65) Prior Publication Data
US 2012/0050232 A1 Mar. 1, 2012

Related U.S. Application Data

(60) Provisional application No. 61/378,349, filed on Aug. 30, 2010.

(51) Int. Cl.
| | |
|---|---|
| *H01H 3/12* | (2006.01) |
| *H01H 13/14* | (2006.01) |
| *G06F 3/0338* | (2013.01) |
| *A63F 13/20* | (2014.01) |

(52) U.S. Cl.
CPC .............. *G06F 3/0338* (2013.01); *A63F 13/06* (2013.01); *A63F 2300/1043* (2013.01)

(58) Field of Classification Search
USPC .......... 200/5 R, 5 A, 5 B, 178, 179, 410, 520, 200/293, 294, 329, 333, 339, 341, 343, 200/345; 345/156–184
See application file for complete search history.

(56) References Cited

U.S. PATENT DOCUMENTS

| | | | |
|---|---|---|---|
| 4,687,200 A | 8/1987 | Shirai | |
| 6,409,600 B1 | 6/2002 | Sobota et al. | |
| 7,116,311 B2 | 10/2006 | Martinez et al. | |
| 7,220,925 B2 * | 5/2007 | Kubo et al. | 200/5 A |
| 7,310,084 B2 * | 12/2007 | Shitanaka et al. | 345/156 |
| 7,479,607 B2 * | 1/2009 | Sack et al. | 200/4 |
| 7,753,788 B2 | 7/2010 | Lum et al. | |

(Continued)

OTHER PUBLICATIONS

Cummings, Alastair H., "The Evolution of Game Controllers and Control Schemes and their Effect on their games," University of Southampton, [http://mms.ecs.soton.ac.uk.2007/papers/6.pdf], Published 2007, 8 pages.

(Continued)

*Primary Examiner* — Edwin A. Leon
*Assistant Examiner* — Anthony R. Jimenez
(74) *Attorney, Agent, or Firm* — Jeremy Snodgrass; Judy Yee; Micky Minhas

(57) ABSTRACT

A control device includes an input mechanism having an actuation surface that is configurable by a user between at least two different surface topologies. In a first configuration, the surface topology may provide a first shape for receiving user input and in a second configuration provide a second shape for receiving user input. The actuation surface in one example includes the upper surface of an input pad having a plurality of input arms and the upper surface of a fill pad having a plurality of fill tabs. At least one of the input pad and the fill pad may be moved in a direction of an axis perpendicular to the face of the control device to change the distance between the upper surfaces. The actuation surface in one example is rotatable to cause translation of at least one of the pads in the direction of the perpendicular axis.

20 Claims, 12 Drawing Sheets

(56) References Cited

U.S. PATENT DOCUMENTS

| | | | |
|---|---|---|---|
| 2004/0222970 A1 | 11/2004 | Martinez et al. | |
| 2005/0215321 A1* | 9/2005 | Hussaini et al. | 463/37 |
| 2005/0255915 A1 | 11/2005 | Riggs et al. | |
| 2008/0311992 A1 | 12/2008 | Young et al. | |
| 2009/0054145 A1 | 2/2009 | Yang et al. | |
| 2009/0203444 A1 | 8/2009 | Kim | |
| 2010/0060614 A1 | 3/2010 | Enns | |
| 2012/0142419 A1* | 6/2012 | Muramatsu | 463/37 |

OTHER PUBLICATIONS

"Extra Pad," GameTech Co., Product catalog downloaded from http://www.gametech.co.jp/products/catalog/8749/8749_1.html, Nov. 27, 2006, 2 pages.

* cited by examiner

CONTROLLER WITH TRANSFORMABLE SURFACE TOPOLOGY

PRIORITY INFORMATION

The present application claims priority from U.S. Provisional Patent Application No. 61/378,349, entitled "Controller with Transformable Surface Topology," by Ikeda et al., filed Aug. 30, 2010, incorporated by reference herein in its entirety.

BACKGROUND

Embodiments of the present disclosure relate to hand-held controllers.

Hand-held controllers are commonly used for providing user input in electrical and mechanical systems. For example, hand-held controllers are often used by users to provide input in processor-based systems such as general-purpose computers or gaming systems. Controllers may include a variety of user interaction mechanisms for providing input. Some common input mechanisms include input or action buttons and joysticks. Input buttons may operate as switches that provide a simple binary signal in response to user input or may include components that provide additional responses such as signals responsive to different amounts of pressure received at the input button. Joysticks usually include a stick that pivots relative to a base to indicate an angle, direction, and/or distance to provide directional control.

More recently, controllers often include directional pads and/or analog thumb sticks. A directional pad (D-pad) is typically operated by a user's thumb to provide directional input. For example, D-pads often include an input corresponding to four ordinate directions (e.g., up, down, left and right) to provide two-dimensional directional input. D-pads may provide a simple binary response indicating selection of a particular directional input or may include components to provide intermediate values, for example, based on the pressure applied to a directional input. Analog thumb sticks also provide two-dimensional input, but like joysticks can also indicate angles and distances based on the position of the stick relative to a default position.

SUMMARY

A control device is provided with an input mechanism having an actuation surface that is configurable by a user between at least two different surface topologies. In a first configuration, the surface topology may provide a first shape for receiving user input at the actuator surface and in a second configuration provide a second shape for receiving user input at the actuation surface.

The actuation surface in one embodiment includes the upper surface of an input pad having a plurality of input arms and the upper surface of a fill pad having a plurality of fill tabs. At least one of the input pad and the fill pad may be moved in a direction of an axis perpendicular to the face of the control device to change the distance between the upper surfaces, thus altering the topology of the actuation surface. In one embodiment, the actuation surface is rotatable about a central axis of the input mechanism to effect changes in surface topology. Rotation of the input pad and fill pad cause translation of at least one of the pads in the direction of the central axis to change a distance between their upper surfaces.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
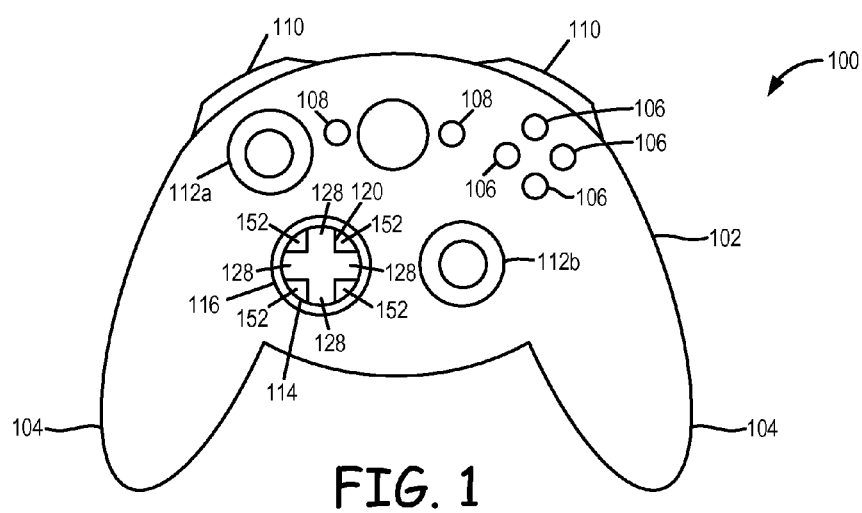
FIG. 1 is a top view of an input device having an input mechanism with a transformable surface topology according to one embodiment.

An input mechanism for a control device is provided that includes a transformable actuation surface to provide at least two different topologies for receiving manual user input. The different surface topologies provide different configurations for actuation of the input mechanism, altering the user's manual interaction with the controller. In various examples, the input mechanism may include a directional pad (D-pad), analog stick or action button having a transformable actuation surface topology.

An input mechanism having a transformable actuation surface topology in one embodiment allows a user to change the actuation surface between at least two configurations, such as between a cross or plus-shaped configuration and a disc or platter-shaped configuration. In this manner, a single input mechanism allows a user to tailor their interaction with the control device based on individual preferences. For example, a user may change the configuration based on a particular application for which the control device is providing input. In a specific gaming scenario, the user may utilize a cross configuration for applications predominantly using single or ordinate only interactions and a platter configuration for more complex interactions, such as for repetitive and/or combinational inputs at variable speeds and timing.

In one embodiment, the actuation surface of the input mechanism is rotatable about a central axis of the input mechanism to effect changes in surface topology. The actuation surface includes the upper surface of an input pad having a plurality of input protrusions and the upper surface of a plurality of fill tabs. Rotation of the input pad and the plurality of fill tabs about the central axis causes translation of at least one of the input pad and the plurality of fill tabs in a linear direction of the central axis. Translation of the input pad and/or fill tabs changes a distance between the upper surface of the input pad and the plurality of fill tabs. This change in distance causes a resultant change in the topology of the actuation surface. By way of example, a first surface topology of the actuation surface may be formed when the distance between the upper surfaces of the input pad and the plurality of fill tabs is at its greatest and a second surface topology may be formed when the distance between the upper surfaces is at its least. The first surface topology may form a first shape, such as a cross or plus configuration, while the second surface topology may form a second shape, such as a disc or platter configuration. It is noted that while the actuation surface includes the upper surfaces of the input pad and the fill tabs, the surface of either in one or more of the configurations may be such that a user's interaction is only with the input pad or the fill tabs.

In one embodiment, the input mechanism is integrated with the controller, requiring no user removable or attached parts to change the actuation surface topology. Moreover, the input mechanism configuration can be changed without any additional tools in one embodiment, being effected in response to rotation of at least a portion of the input mechanism about its central axis. Rotation of the portion of the input mechanism to cause changes in surface topology can occur in either a clockwise or counter-clockwise rotation about the central axis. Furthermore, repeated rotation in a single direction can cause changes back and forth between the first surface topology and the second surface topology without requiring a rotation in the opposite direction.

Changes between configurations of the actuation surface topology can be made without changing the location of the input mechanism relative to the control device. More particularly, the location of the actuation surface for the input mechanism remains fixed relative to the housing or body of the control device. The height of the actuation surface, particularly the upper surface of the input pad, relative to the face of the control device may remain fixed for the different configurations of the input mechanism. The diameter of the actuation service remains fixed as well. In this manner, the distance to actuation and the pivot center of the input mechanism can remain fixed in any of the configurations.

In one embodiment, a controller is provided having a directional-pad (D-pad) actuator formed at least partially within a recess of the controller body. The directional pad includes an input pad having a generally cross-shaped upper surface. That is, the input pad includes four protrusions joined at a central portion, with two of the protrusions extending in opposite directions from each other along a first transverse axis passing through the central portion and the other two protrusions extending in opposite directions from each other along a second transverse axis disposed substantially perpendicularly to the first axis and also passing through the central portion.

The directional pad further includes four generally pie-shaped fill tabs that are translatable along axes parallel to the central axis. Rotation of the input pad and fill tabs causes translation of the fill tabs along the substantially parallel axes. In a first configuration, the fill tabs are positioned with their upper surface at a largest distance from the upper surface of the input pad, and in a second configuration the fill tabs are positioned with their upper service at a smallest or zero distance from the upper surface of the input pad. In one example, a ninety degree rotation in either a clockwise direction or counterclockwise direction of the input pad and fill tabs causes translation of the input pads from the first position to the second position. A further ninety degree rotation in the same direction or a ninety degree rotation in the opposite direction causes translation of the input pads from the second position back to the first position. In this manner, the cross-shaped input pad has a consistent orientation of the four protrusions at the four ordinate directions. In another example, rotation by 180, 270 or another multiple of ninety degrees can cause the input pads to translate between the first and second positions. Other rotational amounts, whether multiples of ninety or not, may further be used.

FIG. 1 is a top view of a controller having a manual input mechanism according to one embodiment of the present disclosure. Although a specific controller is described, it is not intended to be limiting as numerous types of controllers may be used. Controller 100 includes a housing or body 102 forming a majority of the exterior surface of the controller having a shape to interface with the hands of a user. A pair of hand grips 104 extend from a lower portion of the body. A set of input or action buttons 106 are positioned at an upper right portion of the body. These input buttons may be referred to as face buttons due to their orientation on the top face of the body 102 of the controller. The input buttons may be simple switches generating a signal having a binary output to indicate selection by a user. In other examples, the input buttons may be pressure-sensitive switches that generate signals indicating different levels of selection by the user. Additional input buttons 108 are provided at an upper central position of the body and may provide additional functions, such as for navigating a graphical user interface menu. Input buttons 108 may also provide binary or multi-level response signals. A set of input buttons 110 are provided at an upper face of the controller body 102, often referred to as triggers for their intended actuation by the fingers. In many examples, these types of triggers are pressure-sensitive, but need not be.

A first analog thumb stick 112a is provided at an upper left portion of the face of body 102 and a second analog thumb stick 112b is provided at a lower right hand portion of the face of body 102. Each analog thumb stick allows so-called analog input by determining a precise angle of the thumb stick relative to a fixed base portion. Moreover, the analog thumb sticks measure the amount of movement of the stick at the precise angle in order to generate signals responsive to different amounts of input in any direction.

A directional pad (D-pad) 114 is formed in a recess 116 at a center left portion of the face of body 102. In other examples, the D-pad may be formed above the controller surface without a recess. The D-pad includes an actuation surface comprising a cross-shaped input pad 120 and four fill tabs 152. In this example, the input pad includes four input arms 128. In other examples, the input pad may include more or less than four input arms. In one example, the D-pad allows a user to provide directional input control for four distinct ordinate directions (e.g., NSEW) corresponding to the four input arms 128.

The actuation surface topology of D-pad 114 is configurable by a user. In one example, the fill tabs 152 are moveable with respect to input pad 120 to change a distance between the upper surface of input pad 120 and the upper surface of the fill tabs. In this manner, the actuation surface topology of the D-pad may be altered by a user. With the fill tabs 152 in an upward position with respect to the input tab 120, a circular or platter-shaped actuation configuration is provided, and with the fill the tabs in a lowered position with respect to the upper surface of the input tab, a cross-shaped actuation configuration is provided.

In one embodiment, input pad 120 and fill tabs 152 are rotatable within recess 116 about a central axis of the directional pad extending perpendicular to a central portion of the actuation surface. Rotation of input pad 120 and fill tabs 152 causes linear translation of the fill tabs parallel to the central axis. By rotating directional pad 114 in a clockwise or counter clockwise direction about the central axis, the surface topology of actuation surface 118 can be changed. The linear translation of the fill tabs changes the distance between the upper surface of input arms 128 and the upper surface of fill tabs 152, thus altering the actuation surface topology of the directional pad.

Figures 2A, 2B:
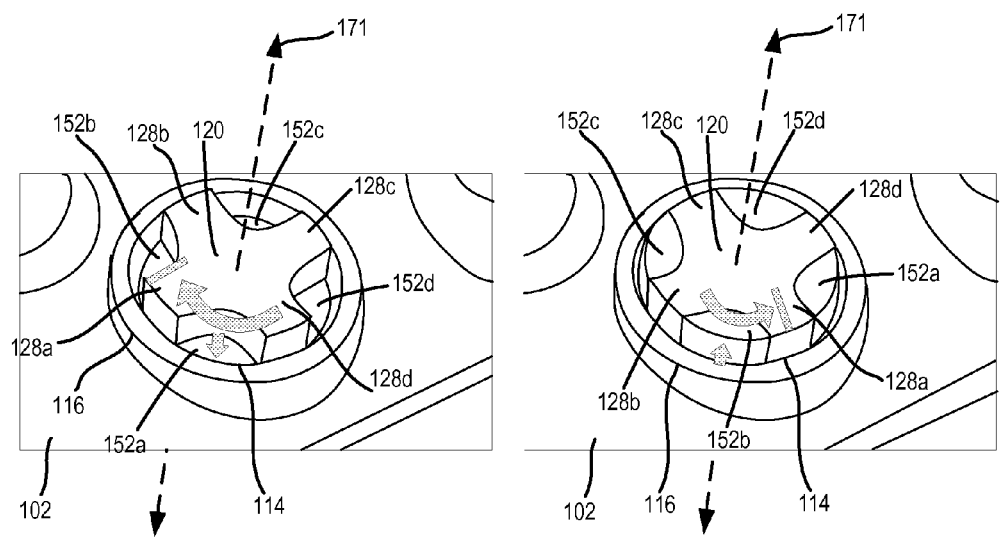
FIGS. 2a-2b are perspective views of a portion of a controller including a directional pad according to one embodiment.

FIGS. 2a-2b are perspective views depicting a portion of controller 100 including directional pad 114 in more detail. FIG. 2a depicts directional pad 114 with fill tabs 152a-152d in a lowered position relative to the face of the controller, forming a first surface topology with the cross-shaped input pad 120 as the primary or exclusive actuation surface. FIG. 2b depicts directional pad 114 with fill tabs 152a-152d in a raised position relative to the face of the controller, forming a second surface topology with the input pad and fill tabs together forming a platter-shaped actuation surface.

With reference to FIG. 2a, the actuation surface has a topology defined by the upper surface of the cross-shaped input pad 120. Input pad 120 includes four arm members 128a-128d, extending in a radial direction outward from a central portion of the input pad. Arms 128a and 128c extend in opposite directions from each other along a first transverse axis, passing through a central portion of the input pad, and arms 128b and 128d extend in opposite directions from each other along a second transverse axis disposed substantially perpendicularly to the first axis and passing substantially through the central portion of the input pad. In this manner, the four arms and central portion form a cross shape. In some examples, each of the arms may have an upper surface that slopes upwardly along the length of the arm in the direction extending radially outwardly from the central portion of the input pad.

Pressure applied at input arm 128a may indicate a downward input, pressure applied at input arm 128b may indicate a leftward input, pressure applied at input arm 128c may indicate an upward input and pressure applied at input arm 128d may indicate a rightward input. Contacts may be formed on the underside of input pad 120 with corresponding electrodes provided under each input arm in recess 116. When the contacts engage the electrodes, a signal indicating input of the corresponding input arm 128 can be generated. In various examples, simultaneous selection of multiple input arms may be provided to indicate other directions such as a diagonal direction between two ordinate directions. As earlier described, pressure sensitive electrodes may be used in some examples, so that different inputs may be provided at a single input arm.

The upper surface of input pad 120 is at a first height relative to the face of the controller. The individual fill tabs 152 have an upper surface that is at a different height relative to the face of the controller. In this example, the input pad surface is above the face of the controller and the fill tab surfaces are below the face of the controller. The difference in height of the surfaces in the direction of the central axis defines a first distance. In typical use by an average human hand, the topology of the actuation surface in the position of FIG. 2a provides a cross-shaped configuration for receiving manual input. The first distance may be such that an average user's thumb (or other finger) will only contact the upper surface of input pad 120 when the fill pad is in its lowered position. Nevertheless, it is possible that the user's finger may contact the upper surface of fill tabs 152 in the configuration of FIG. 2a as well. Furthermore, some implementations may include configurations that define two or more surface topologies, wherein the upper surface of both the fill tabs and input pad are contactable by a user in each configuration.

Directional pad 114 is depicted in FIG. 2b with fill tabs 152a-152d in a raised position to provide a platter-shaped configuration for the actuation surface. In this example, rotation of the input pad and fill pad about central axis 171 causes movement of fill tabs in the linear direction of the central axis. Rotation of input pad about the central axis positions each input arm 128a-128d ninety degrees in the counterclockwise direction from its position in FIG. 2a. Likewise, rotation of the fill tabs positions each fill tab 152a-152d 90 degrees from its position in FIG. 2b.

The upper surface of input pad 120 is at the same height relative to the face of the controller as in FIG. 2a. However, fill tabs 152a-152d are now raised with respect to body 102 to at least partially occupy the open spaces that were between neighboring ones of the arms 128a-128d in the configuration of FIG. 2a. In this particular example, a second distance, different from the first, exists between the upper surface of input pad 120 and fill tabs 152a-152d. In other examples, the fill tabs may be raised to the same height above the controller face as the input pad.

Rotation of the input pad and fill in the opposite direction, back to the position of FIG. 2a, causes translation of the fill pad along the central axis back to its original position. The pads may also be rotated another ninety degrees from the position in FIG. 2b to cause the fill pad to move back to the position in FIG. 2a. Another ninety degree rotation will cause the fill pad to move back to the position of FIG. 2b and so on every ninety degrees in either a clockwise or counterclockwise direction.

Although rotational movement of a portion of the D-pad is described for effecting movement of the fill tabs, other means may be used to move the fill tabs. For example, one embodiment may include a plate that slides in response to user input to raise and support the fill tabs in their upward position.

Input pad 120 is not limited to a cross shape as depicted in FIGS. 2a-2b and may include any number of input arms or buttons. For example, the input pad may include less or more than four input arms 128. Eight input arms may be provided, with additional input arms extending at forty-five degree angles between each of the input arms shown in FIGS. 2a-2b. In such a configuration, eight fill tabs 152 can be provided with each fill tab between adjacent input arms. In another example, the input pad 120 may be formed of four discrete input buttons corresponding to directional inputs. With reference to FIG. 1 for example, a configuration of four input buttons 106 may be provided, with each button indicating a directional input to form a directional pad. The surface topology may be altered by providing additional input buttons in response to user input. For example, rotation of the four buttons about a central axis may be used to expose additional buttons for receiving directional input corresponding to an additional set of directions.

Figure 3A:
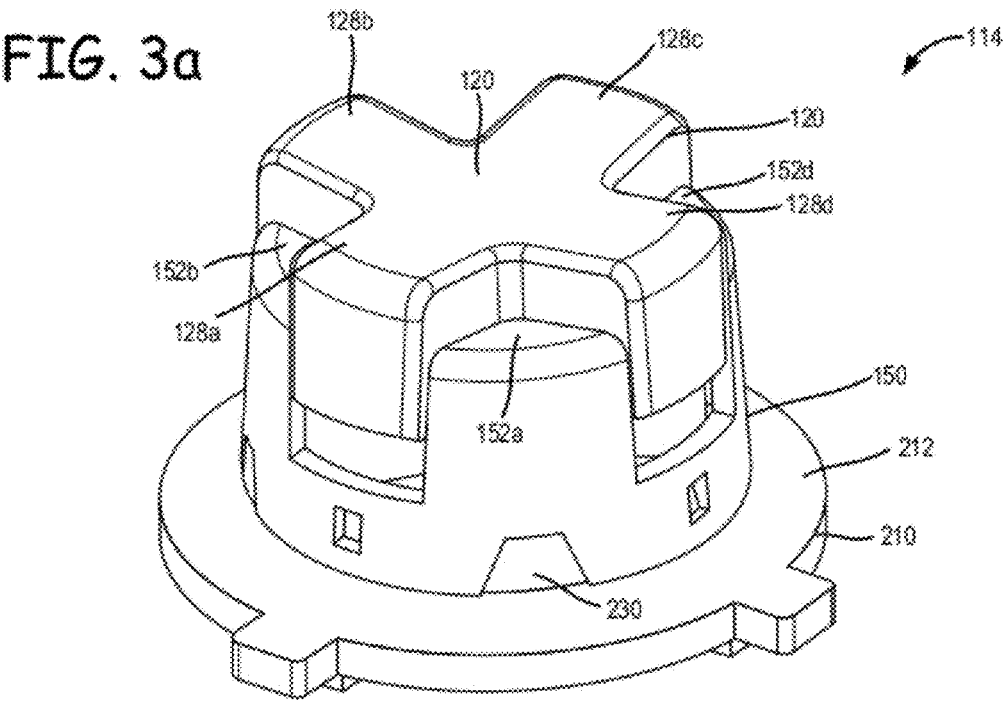
FIGS. 3a-3b are perspective views of an assembled directional pad according to one embodiment.
Figure 3B:
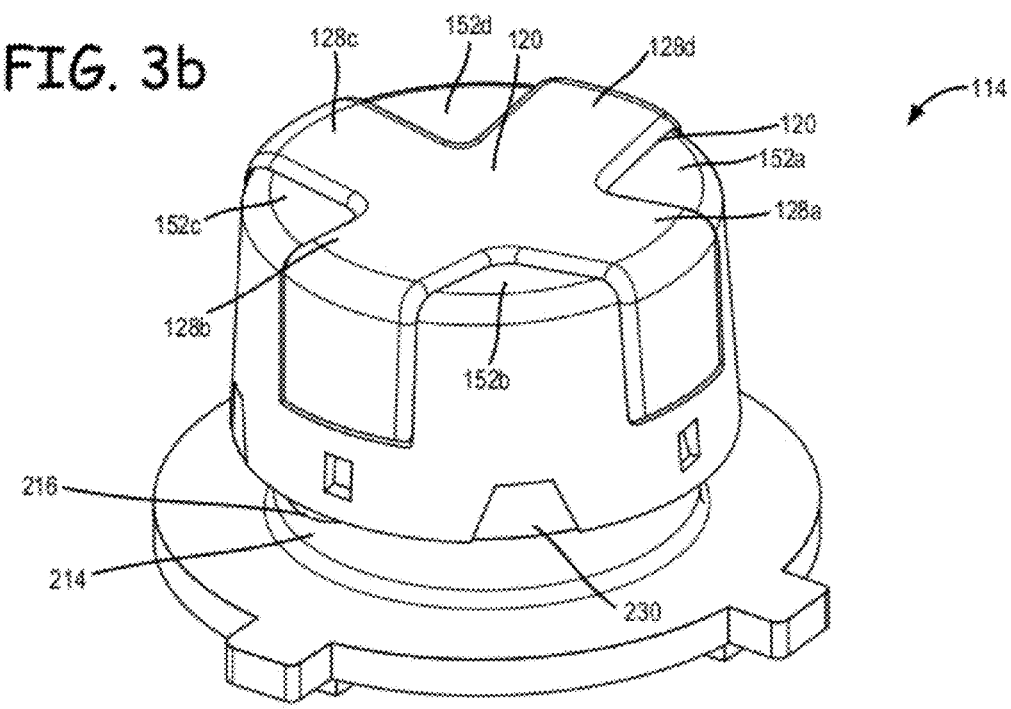

FIGS. 3a and 3b are additional perspective views of directional pad 114, depicted without body 102 to illustrate further details in accordance with one embodiment. In FIG. 3a, the fill tabs 152a-152d are in a lowered position, providing a cross-shaped configuration, and in FIG. 3b the fill tabs are in a raised position to provide a platter-shaped configuration. In this example, the fill tabs are part of a fill pad 150, comprising a circular ring portion from which each of the fill tabs extends between adjacent ones of the input arms 128l-128d.

Figure 4:
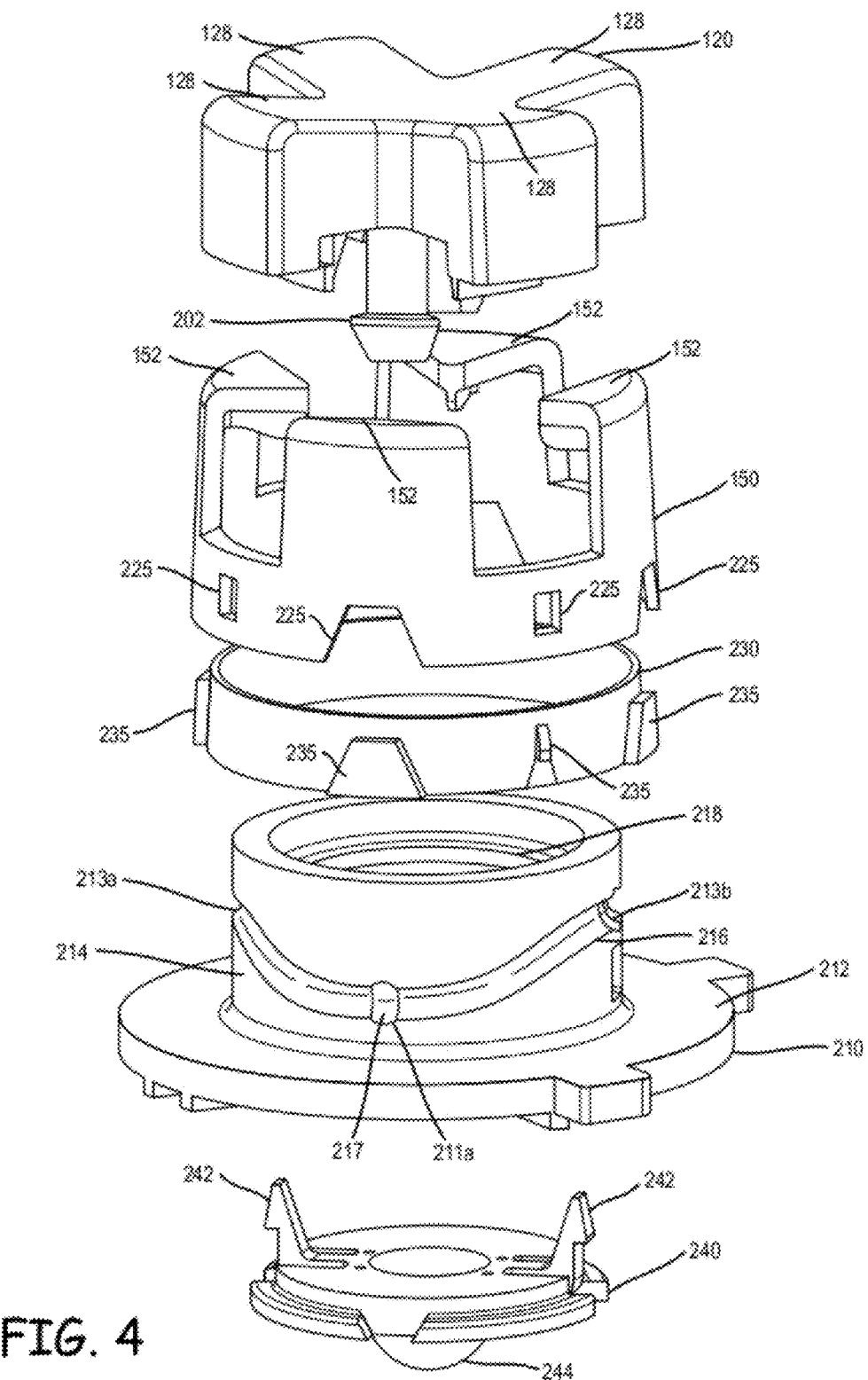
FIG. 4 is an exploded perspective view of various components that may be used to implement a directional pad according to one embodiment.

The input pad 120 and fill tabs are coupled to a circular base 210 in a manner that permits rotational movement with respect to the base. The input pad 120 is connected so as to inhibit vertical movement with respect to the base, and consequently the face of controller 100. Fill pad 150 is connected so as permit vertical movement with respect to the base. The fill pad 150 is coupled to an inner snap ring 230, which includes at least one protrusion extending inwardly from an inner surface thereof toward the central axis of the direction pad. The protrusions are not visible in FIGS. 3a-3b, but a single protrusion 224 is depicted in FIG. 4.

The circular base includes a base plate 212 and an upwardly extending circular base ring 214. A barrel-shaped cam groove 216 is formed in the outer wall of the base ring. The cam groove 216 is formed continuously around the outer wall of the base ring. The distance of groove 216 relative to the upper surface of base plate 212 changes along the length of the groove around barrel ring 214. At least one peak, corresponding to the groove's furthest distance from base plate 212, and at least one valley, corresponding to the groove's closest distance to base plate 212, are provided.

Protrusions 224 of snap ring 230 engage cam groove 216 so that rotational movement of the snap ring around base ring 214 causes vertical movement of the snap ring, and consequently fill pad 150. Accordingly, a user may apply force to input 120 pad and/or fill pad 150 to cause rotation of the components with respect to base 210, and consequently the body of controller 100. Protrusions 224 move within cam groove 216 to cause linear translation of the fill pad with respect to base 210. When the protrusions 224 are at the valley(s) of the groove, the fill ring is at its closest position to the base plate as shown in FIG. 3a. Consequently, the fill tabs 152a-152d are at their furthest positions from input arms 128a-128d forming a predominantly cross-shaped actuation surface. When the protrusions are at the peak(s) of the groove, the fill pad is at its furthest position from the base plate as shown in FIG. 3b. Consequently, the fill tabs are at their closest position to the input arms forming a predominantly platter-shaped actuation surface.

In one embodiment, rotation of the fill ring by 90 degrees causes movement of the fill pad from its closest position to base plate 212 to its furthest distance from base plate along central axis 171. In this manner, the orientation of the cross-shaped input pad will remain constant for every ninety degree rotation. In one particular example, the cam groove includes two peaks where the cam groove is at is farthest distance from the base plate, and two valleys where the cam groove is at is closest distance to the base plate. Accordingly, a ninety degree rotation of the fill pad when at its closest position to the base plate causes movement of the fill ring to its furthest position from the base plate. An additional ninety degree rotation of the fill pad will cause movement of the fill pad back to its closest position to the base plate. The input pad and fill pad can continue to be rotated in a single direction to cause movement of the fill ring with respect to base 210. In this manner, rotation in the opposite direction is not required. However, the input pad and fill pad may also be rotated in the opposite direction to cause movement of the fill pad relative to base 210.

FIG. 4 is an exploded perspective view depicting the separate components for forming D-pad 114 in one example. A pivot piece 240 is provided at the bottom of the D-pad to enable movement of the D-pad in response to user input. Pivot protrusion 244 extends from a bottom surface of the pivot piece, forming a hemispherical supporting member. A base plate (not shown), attached to the body of the controller for example, can have a complementary hemispherical recess for receiving the protrusion 244. Downward vertical pressure applied at the actuation surface causes the D-pad to incline in the pressing direction with a contact between the pivot protrusion 244 and the base plate serving as a fulcrum.

Figure 5:
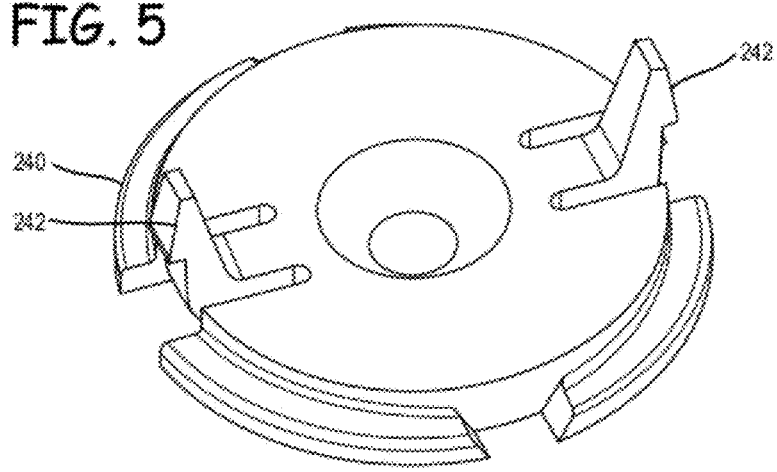
FIG. 5 is a top perspective view of the bottom of the pivot piece in FIG. 4.
Figure 6:
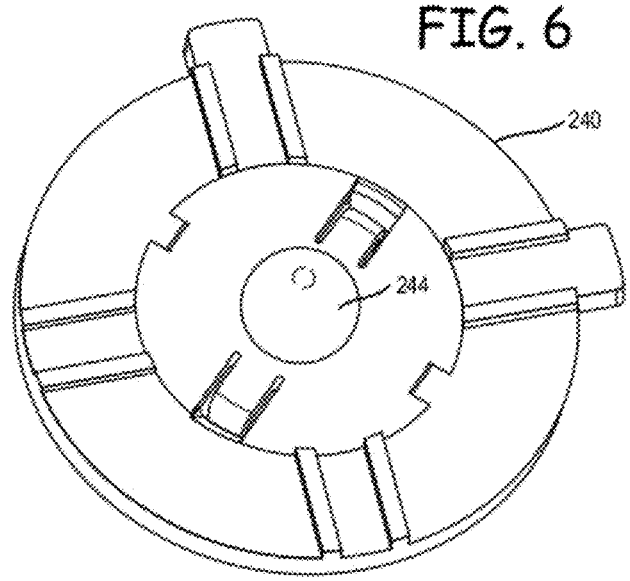
FIG. 6 is a bottom perspective view of the top of the pivot piece in FIG. 4.
Figure 7:
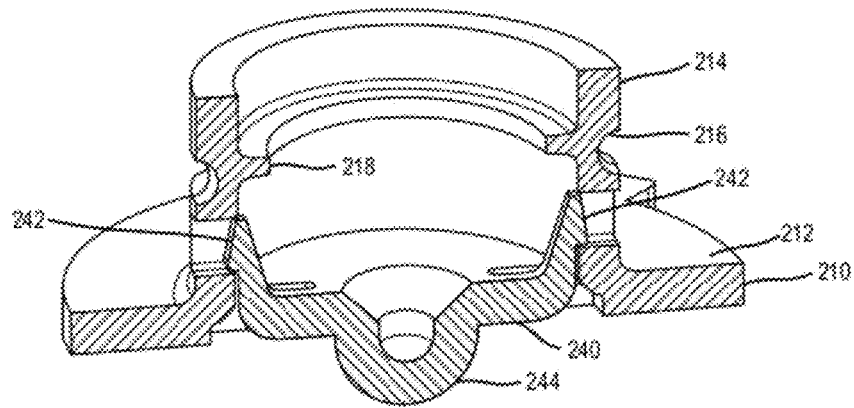
FIG. 7 is a cross-sectional view of the base and pivot piece in FIG. 4 in their secured position.

FIGS. 5 and 6 are perspective views of the upper and lower surfaces, respectively, of the pivot piece 240 in one example. FIG. 7 is a cross-sectional view of the pivot piece in its secured position with a base 210. Clips 242 extend upwardly from the upper surface of the pivot piece for attaching the pivot piece to base 210. Base 210 includes a base plate 212 and base ring 214 extending vertically from the upper surface of the base plate. Receptacle openings in base ring 214 engage clips 242 of the pivot piece to secure the components together. Barrel-shaped cam groove 216 is depicted in cross-section, illustrating its hemispherical shape with a concave surface for receiving protrusions 224 of snap ring 230. The hemispherical shape of pivot protrusion 244 provides a rotational support member with a base plate serving as a fulcrum for receiving user input on directional pad 114.

In one embodiment, conductive members (not shown) are formed at positions on the lower surface of the pivot piece corresponding to the directions of the input pad. With a cross-shaped input pad, for example, four conductive members may be placed at the four ordinate directions, each at opposite ends of orthogonal axes disposed at the bottom of the pivot piece and intersecting a central portion of the pivot piece. Corresponding electrodes or other conducting members may be aligned within the recess (e.g., on a base plate) so that inclination of the D-pad in the ordinate directions causes contact between the conducting members of the pivot piece and the conducting members in the controller recess. In other examples, more or less than four conducting members may be used. For example, a directional-pad with eight ordinate directional inputs may be used with four additional conductive members disposed on the lower surface of the pivot piece. These members may be provided on axes forming forty-five degree angles at their intersection with the first two axes.

Returning to FIG. 4, cam groove 216 is formed in the outer wall of the base ring 214. The groove 216 extends along the outer wall, circumferentially around the extent of the ring. The groove is not uniformly circumferential, but forms an oscillating shape with two peaks and valleys spaced equally along the distance of the groove. In the view of FIG. 4, a single valley 211a and two peaks 213a and 213b of groove 216 are visible but an additional valley is disposed 180 degrees opposite to valley 211a between peaks 213a and 213b.

Figure 8:
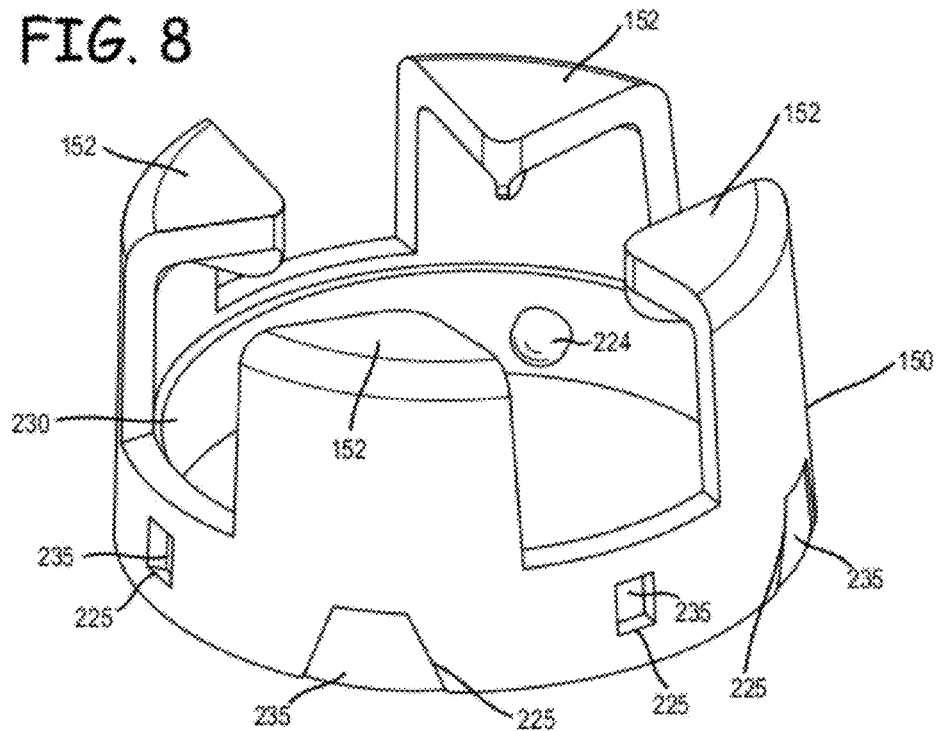
FIG. 8 is a perspective view of the fill pad in FIG. 4.

FIG. 8 is a perspective view of fill pad 150 in its secured position with snap ring 230. Fill tabs 152 extend vertically from a lower circular ring portion of the fill pad. Each of the fill tabs 152 includes an upper surface, in this example having a generally pie shape. Snap ring 230 couples to fill pad 150 using interlocking features, including key features 235 of the snap ring which interlock with receptacle openings 225 in the fill pad. As illustrated, one or more protrusions 224 of snap ring 230 are provided for engaging groove 216 of base ring

214. In one example, two protrusions 224 are provided, for example along an axis intersecting the center of the ring so as to be 180 degrees apart. In this manner, the two protrusions may engage groove 216 at corresponding locations along the oscillating groove. For example, when a first protrusion is positioned at one of the valleys of the cam groove, the other protrusion will be positioned at the other valley of the groove. In other embodiments, protrusions 224 may be formed directly on the fill tab 150 without using a snap ring.

Figure 9:
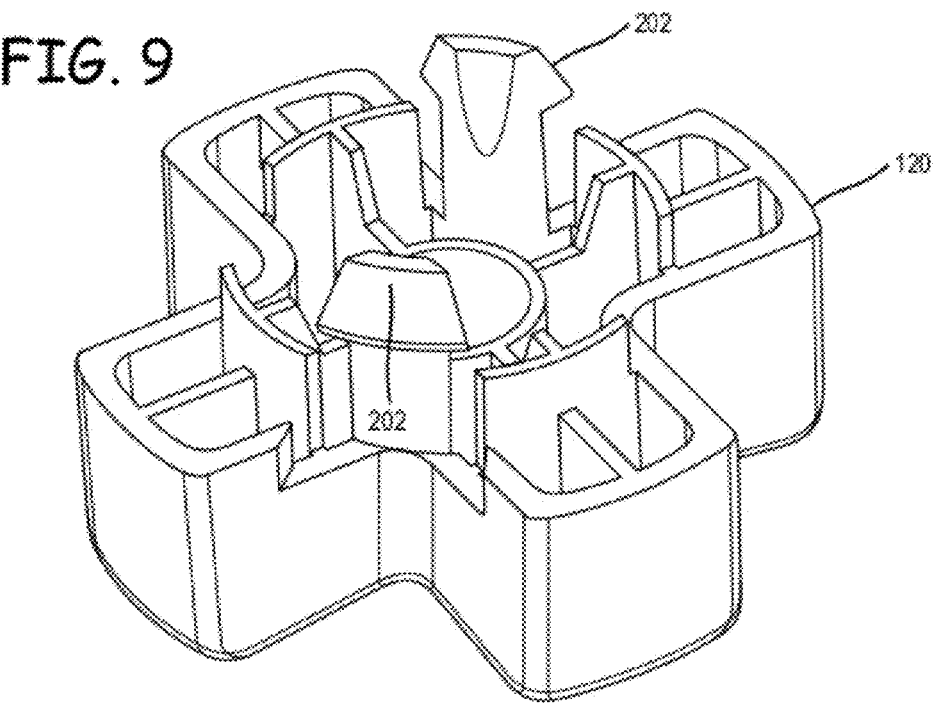
FIG. 9 is a perspective view depicting the bottom of the input pad in FIG. 4.
Figure 10:
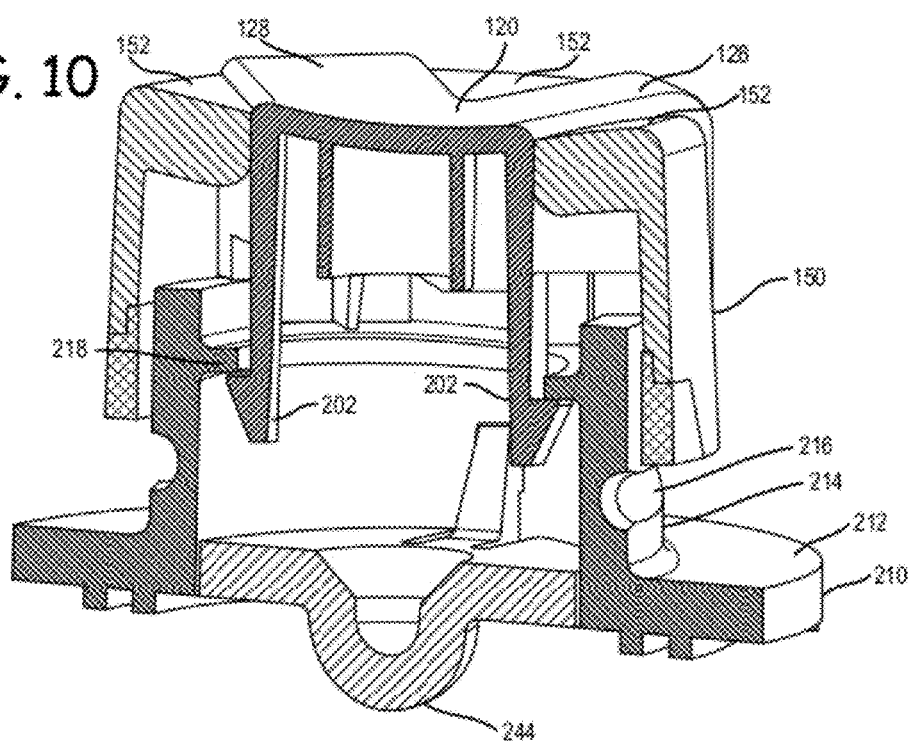
FIG. 10 is a cross-sectional view of the assembled directional pad in FIG. 4.

FIG. 9 is a perspective view showing a bottom region of input pad 120 including clips 202. FIG. 10 is a cross-sectional view of the assembled directional pad. The inner wall of base ring 214 includes an inwardly extending protrusion ring 218 for engaging clips 202 of input pad 202. Clips 202 are depicted extending in a direction of the central axis intersecting a central region of the directional pad 114. The clips couple with inner protrusion ring 218 to permit rotational movement of the input pad 100 relative to the base 210, while maintaining the input pad's vertical position so that surface of the input pad remains at a fixed height relative to the controller body.

The input pad is aligned with arms 128 positioned between adjacent ones of the fill tabs 152. The input pad is inserted through the fill pad, with clips 202 securing the input pad to the base 210. Protrusions 224 of the snap ring engage the groove 216, securing the fill pad 150 to the base 210. Secured in this manner, rotational force applied to input pad 120 exerts rotational force on fill pad 150, causing both components to rotate about a central axis of the directional pad. Groove 216 provides a guiding force to the fill pad 150 as it rotates about base 210. The force exerted on the protrusions by the cam groove causes vertical movement of the fill pad in the direction of the central axis as it rotates around base 210 about the central axis. The groove has an oscillating cam shape with two peaks and two valleys. Each peak is equally distant from the two valleys. The fill tabs have a closest position relative to the base 210 as shown in FIG. 3a when the protrusions are aligned at the valleys of the groove 216 and a farthest position relative to the base 210 as shown in FIG. 3b when the protrusions are aligned at the peaks of the groove.

In one embodiment, protrusions 224 are oversized with respect to the size of the barrel groove. For example, they may have a cross-sectional diameter larger than a diameter of the barrel shape. Detents 217 can also be provided at the valleys and peaks of the groove. The detents have a larger cross-sectional diameter than the groove so that an overcompensation force is required to initiate rotation of the D-pad when the protrusions are aligned in the detents. Stability or a tighter engagement can thus be provided at predetermined alignments, based on the position of the protrusions relative to the input pad and fill tabs.

Figure 11:
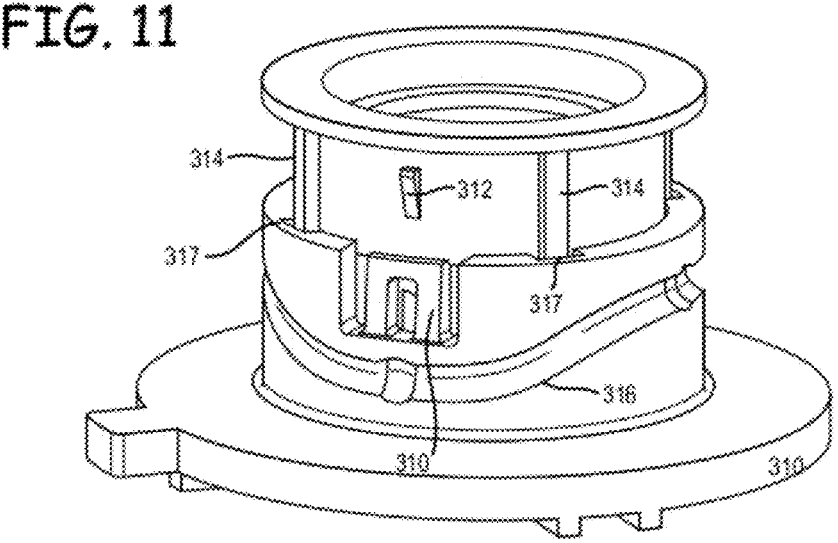
FIG. 11 is a perspective view of a directional pad base and inner snap ring according to one embodiment.
Figure 12:
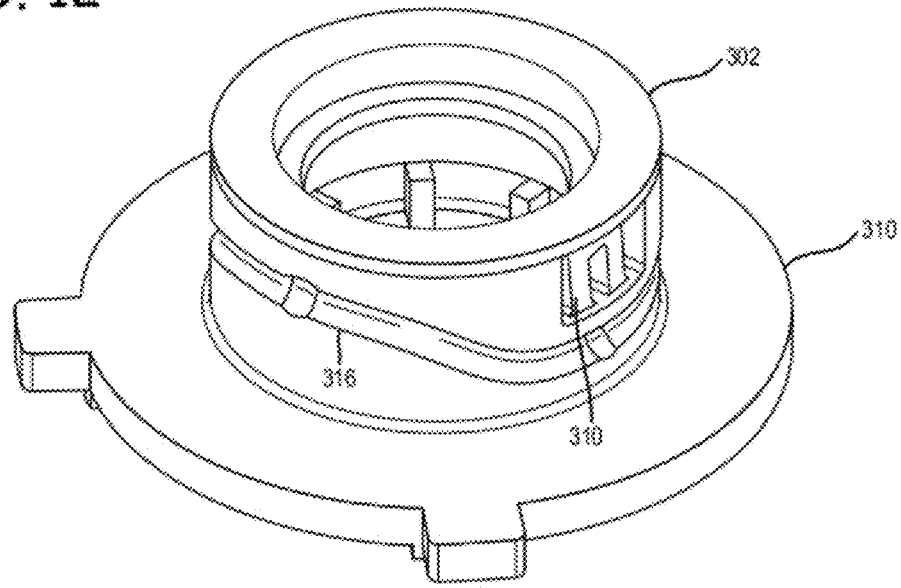
FIG. 12 is a perspective view of the directional pad base and inner snap ring of FIG. 11 in their secured position.
Figure 13:
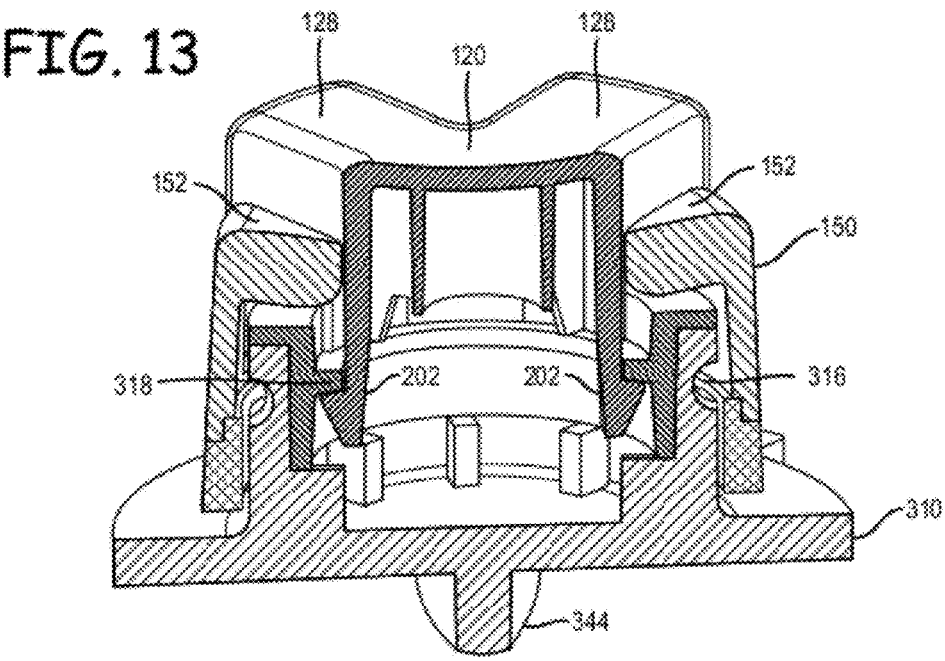
FIG. 13 is a cross-sectional view of a directional pad including the base and inner snap ring of FIGS. 11-12.
Figure 14:
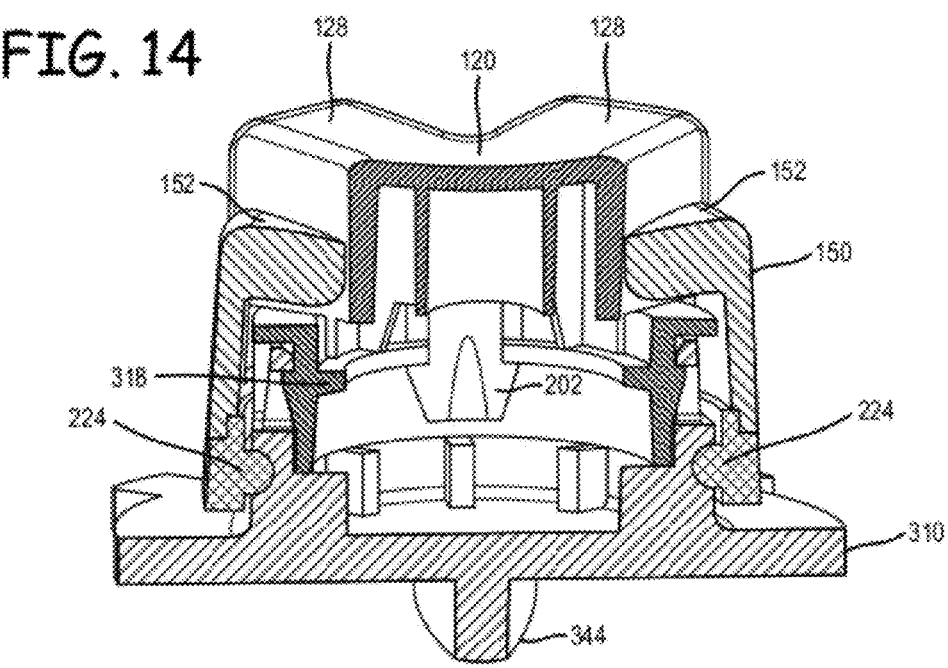
FIG. 14 is a cross-sectional view of a directional pad including the base and inner snap ring of FIGS. 11-12.

FIGS. 11-14 depict another embodiment of a directional pad 114 in accordance with the present disclosure. FIGS. 11 and 12 are perspective views of an alternate base 310 piece and a base ring 302. FIGS. 13 and 14 are cross-sectional views depicting the full assembly with base piece 310 and base ring 302.

Base ring 302 couples to the base 310 using one or more clips 310 and receptacles 312 as shown in FIG. 11. Rails 314 and grooves 317 are provided for aligning the components for tight coupling as shown in FIG. 12. Base 310 incorporates a pivot protrusion 344 so that a separate pivot piece 240 is not used. Protrusion 344 has a generally hemispherical shape extending from a lower surface of the base.

Input pad 120 has clips 202 engaged on an inner protrusion ring 318 of base ring 302 as shown in FIGS. 13 and 14. Clips 202 engage inner protrusion ring 318 to prevent vertical movement of the input pad while permitting rotational movement of the input pad with respect to the base 310. Fill pad 150 is depicted in its lower orientation in both FIGS. 13 and 14. Rotational movement of input pad 120 and fill pad 150 is as described earlier with fill pad 150 moving vertically with respect to bottom 210 as protrusions 224 engage barrel-shaped cam groove 216.

Figure 15:
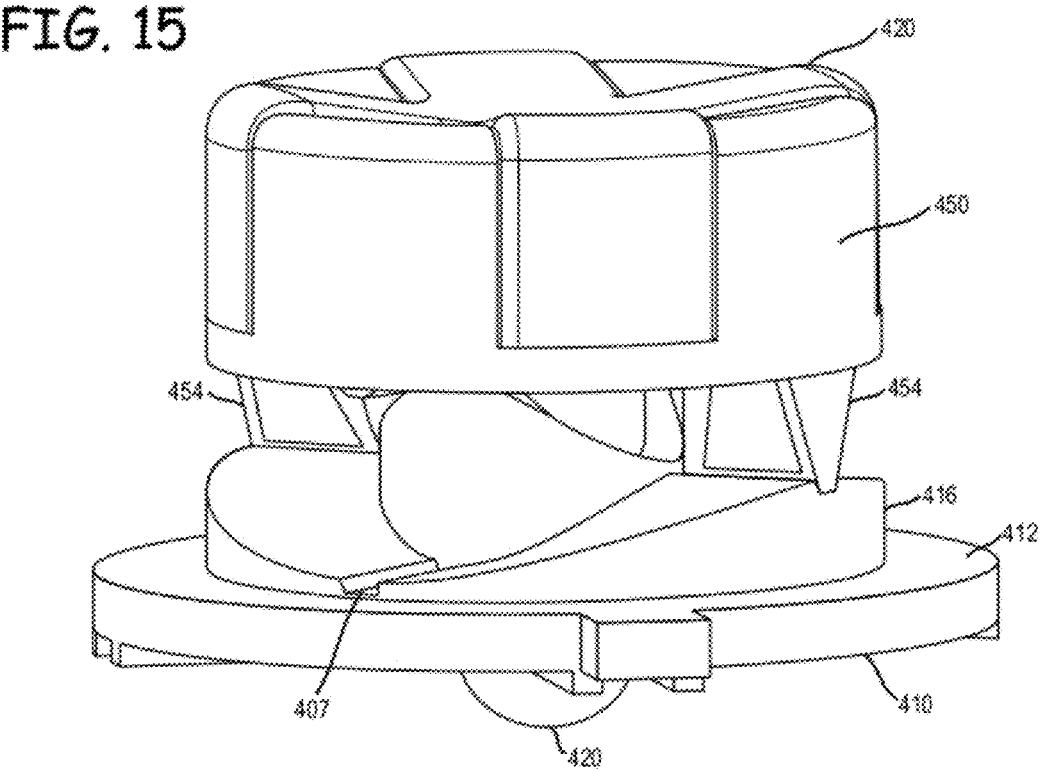
FIG. 15 is a perspective view of a directional pad according to one embodiment.
Figure 16:
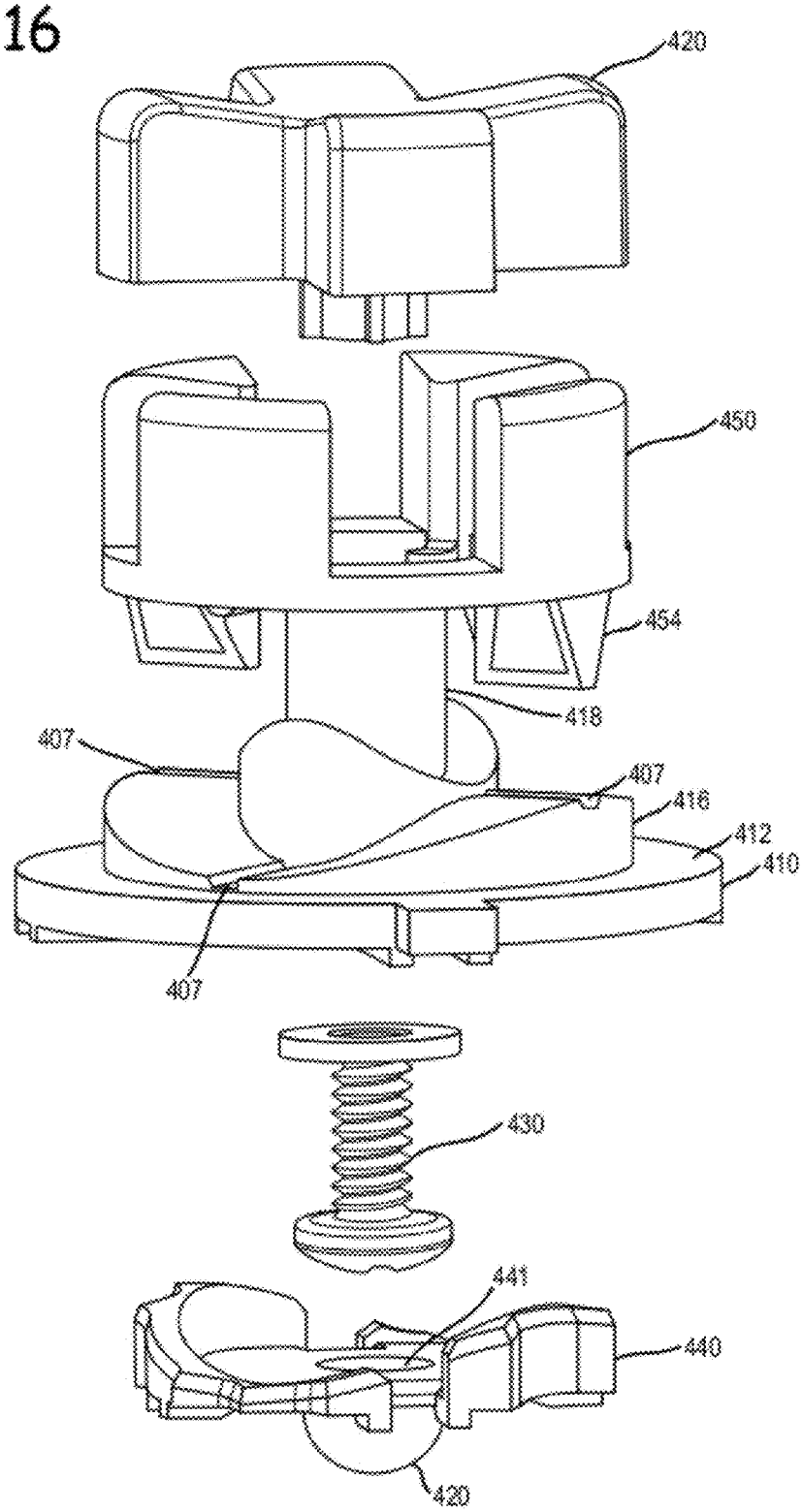
FIG. 16 is an exploded perspective view of various components that may be used to implement the directional pad of FIG. 15.

FIGS. 15-16 are perspective views depicting a directional pad 114 according one embodiment of the present disclosure incorporating a face cam in place of a cam groove as earlier described. FIG. 15 depicts the assembled directional pad while FIG. 16 depicts the individual components forming the directional pad.

A pivot piece 440 is provided with a downwardly extending hemispherical pivot protrusion 420 as earlier described. A recess 441 is provided in the upper surface of the pivot piece 440 for receiving the head of a screw 430. Screw 430 attaches to the input pad, extending through a shaft 418 of base 410 and an opening in fill pad 450. The attachment with screw 430 permits rotational movement of input pad 420 with respect to base 410. The attachment further permits both rotational and vertical movement of the fill ring 450 with respect to base 410.

Base 410 includes a base plate 412 having an upper surface on which is formed a face cam 416. The face cam includes a sloping upper surface, having two valleys where the surface of the cam is closest to the surface of the base plate and two peaks where the surface of the cam is furthest from the surface of the base plate. The valleys are disposed at opposite ends of a first axis passing through the center of the base and the peaks are disposed at opposite ends of a second transverse axis passing through the center of the base.

Guide members 454 extend vertically from a lower surface of fill pad 450, contacting the upper surface of the face cam to vertically align the fill pad relative to the base 410. The shaft 418 of the base 410 passes through the fill pad, stabilizing lateral movement thereof. In its assembled position, the input pad 420 maintains a constant vertical position relative to the base 410. Both the input pad 420 and fill ring 450 are rotatable about a central axis of the directional pad. When a rotational force is applied to the input pad 420 and/or fill pad 450, these components rotate. The fill pad translates vertically with respect to the base 410 as guide members move along the cam face. Detents 407 are provided at the peaks and valleys of the face cam. The lower portions of guide members 452 fit within the detents so that a larger force is required to move the guide members through this portion of the face cam. Accordingly, an overcompensation force is required to move the fill ring when the guide members are positioned within the detents.

In the position shown in FIG. 15, guide members 454 are at the peaks of face cam 416, thus positioning the fill pad 450 at its furthest distance from base 410. The fill tabs 452 are at their highest position relative to the surface of the controller, for example, forming a platter-shaped actuation surface configuration.

Rotation of the input pad 420 in either a counter clockwise or clockwise direction causes movement of protrusions 454 along the face cam 416. For example a ninety degree rotation in the counter clockwise direction will cause protrusions 454 to traverse to the lowest position of cam at the valleys, thus causing the fill pad 420 to be at its lowest position with respect to base 410.

Figure 17:
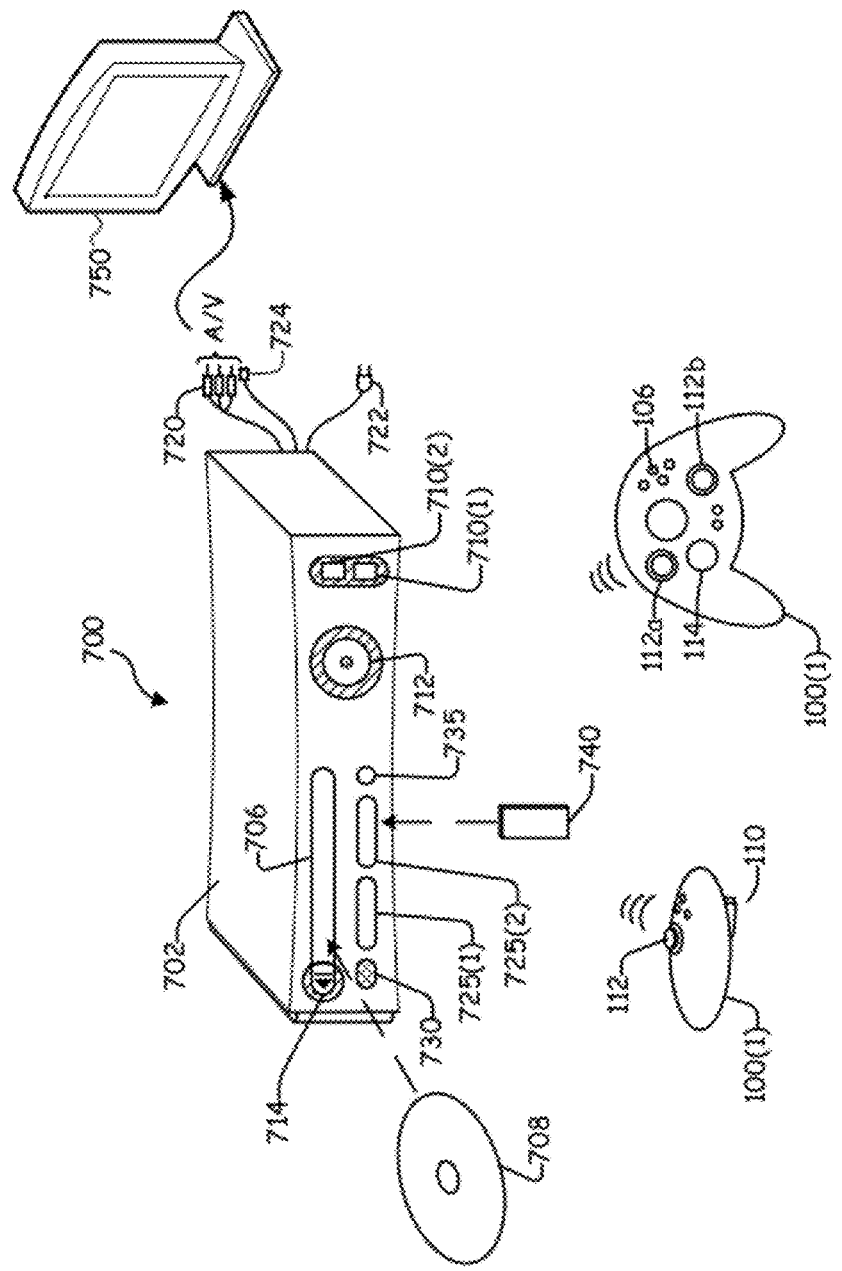
FIG. 17 is a perspective view of an exemplary gaming and media system.

Various aspects of the disclosed technology may be implemented in connection with gaming systems. Accordingly, an enhanced understanding may be gained by briefly discussing the components and operation of an exemplary gaming system 700, as depicted in FIG. 17, on which various embodiments may be employed. The following discussion of FIG. 17 is intended to provide a brief, general description of a suitable environment in which concepts presented herein may be implemented. The disclosed technology is not limited to use in gaming and media systems, or even to computer-based systems. Embodiments of the present disclosure may be used in any application or environment where user input via an input device such as a controller is used. By way of non-limiting example, embodiments of the present disclosure may include controllers for gaming systems, televisions, general computing systems, robotic control systems, radio controlled or wired controlled devices, remote imaging systems such as to control cameras or the like, medical device controls, etc.

As shown in FIG. 17, gaming and media system 700 includes a game and media console (hereinafter "console") 702. In general, console 702 is one type of computing system, as will be further described below. Console 702 is configured to accommodate one or more wireless controllers, as represented by controllers 100(1) and 100(2). Console 702 is equipped with an internal hard disk drive (not shown) and a portable media drive 706 that support various forms of portable storage media, as represented by optical storage disc 708. Examples of suitable portable storage media include DVD, CD-ROM, game discs, and so forth. Console 702 also includes two memory unit card receptacles 725(1) and 725(2), for receiving removable flash-type memory units 740. A command button 735 on console 702 enables and disables wireless peripheral support.

Console 702 also includes an optical port 730 for communicating wirelessly with one or more devices and two USB (Universal Serial Bus) ports 710(1) and 710(2) to support a wired connection for additional controllers, or other peripherals. In some implementations, the number and arrangement of additional ports may be modified. A power button 712 and an eject button 714 are also positioned on the front face of game console 702. Power button 712 is selected to apply power to the game console, and can also provide access to other features and controls, and eject button 714 alternately opens and closes the tray of a portable media drive 706 to enable insertion and extraction of a storage disc 708.

Console 702 connects to a television or other display (such as monitor 750) via A/V interfacing cables 720. In one implementation, console 702 is equipped with a dedicated A/V port (not shown) configured for content-secured digital communication using A/V cables 720 (e.g., A/V cables suitable for coupling to a High Definition Multimedia Interface "HDMI" port on a high definition monitor 750 or other display device). A power cable 722 provides power to the game console. Console 702 may be further configured with broadband capabilities, as represented by a cable or modem connector 724 to facilitate access to a network, such as the Internet. The broadband capabilities can also be provided wirelessly, through a broadband network such as a wireless fidelity (Wi-Fi) network.

Each controller 100 is coupled to console 702 via a wired or wireless interface. In the illustrated implementation, the controllers 100 are USB-compatible and are coupled to console 702 via a wireless or USB port 710. Console 702 may be equipped with any of a wide variety of user interaction mechanisms. In an example illustrated in FIG. 17, each controller 100 is equipped as described in FIG. 1.

In one implementation, a memory unit (MU) 740 may also be inserted into controller 100 to provide additional and portable storage. Portable MUs enable users to store game parameters for use when playing on other consoles. In this implementation, each controller is configured to accommodate two MUs 740, although more or less than two MUs may also be employed.

Gaming and media system 700 is generally configured for playing games stored on a memory medium, as well as for downloading and playing games, and reproducing pre-recorded music and videos, from both electronic and hard media sources. With the different storage offerings, titles can be played from the hard disk drive, from an optical disk media (e.g., 708), from an online source, or from MU 740. A sample of the types of media that gaming and media system 700 is capable of playing include:

Game titles played from CD and DVD discs, from the hard disk drive, or from an online source.
Digital music played from a CD in portable media drive 706, from a file on the hard disk drive (e.g., music in the Windows Media Audio (WMA) format), or from online streaming sources.
Digital audio/video played from a DVD disc in portable media drive 706, from a file on the hard disk drive (e.g., Active Streaming Format), or from online streaming sources.

During operation, console 702 is configured to receive input from controllers 100 and display information on display 750. For example, console 702 can display a user interface on display 750 to allow a user to select a game using controller 100 and display achievement information as discussed below.

Figure 18:
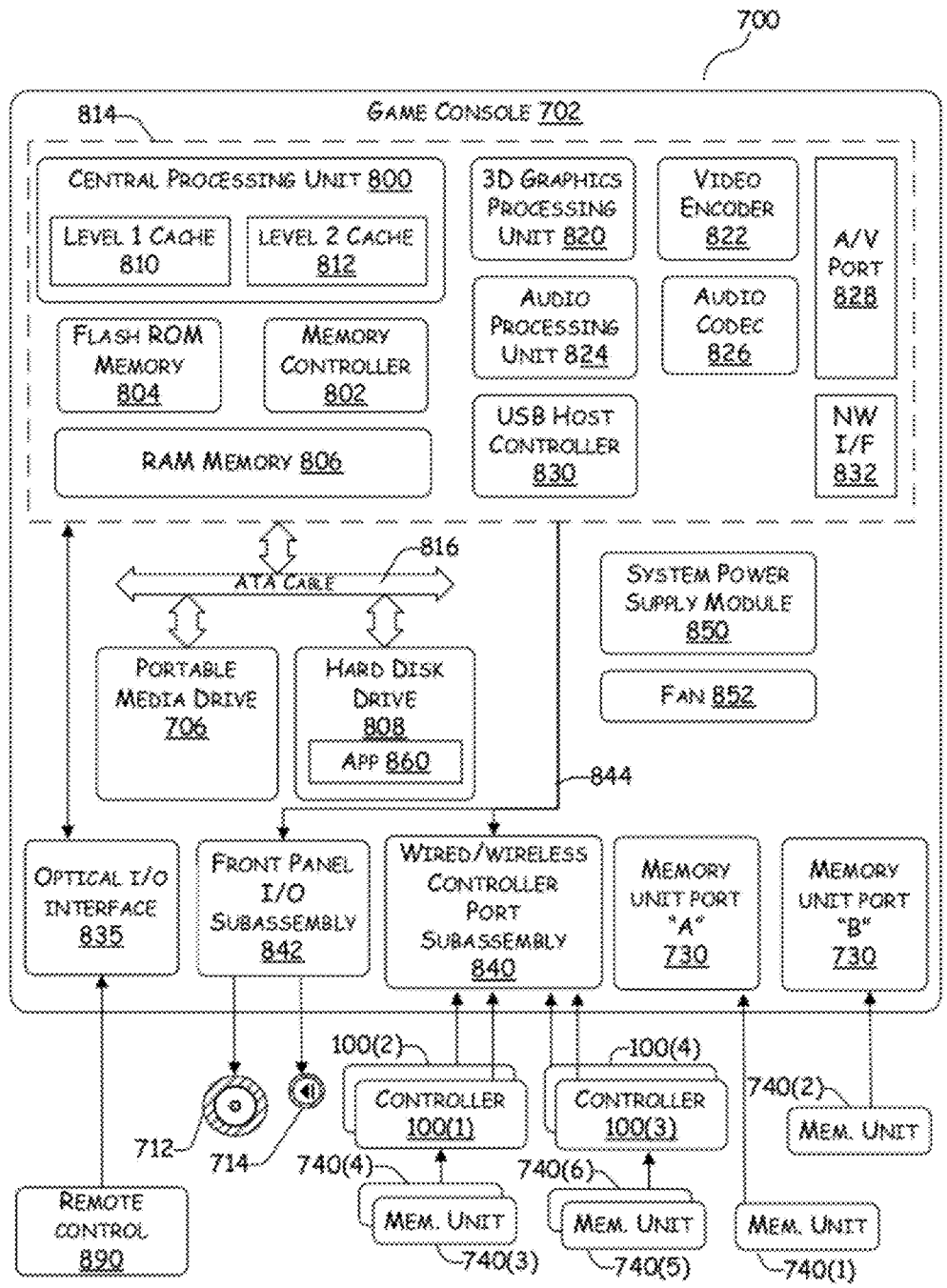
FIG. 18 is an exemplary functional block diagram of components of the gaming and media system shown in FIG. 17.

FIG. 18 is a functional block diagram of gaming and media system 700 and shows functional components of gaming and media system 700 in more detail. Console 702 has a central processing unit (CPU) 800, and a memory controller 802 that facilitates processor access to various types of memory, including a flash Read Only Memory (ROM) 804, a Random Access Memory (RAM) 806, a hard disk drive 808, and portable media drive 706. In one implementation, CPU 800 includes a level 1 cache 810 and a level 2 cache 812, to temporarily store data and hence reduce the number of memory access cycles made to the hard drive 808, thereby improving processing speed and throughput.

CPU 800, memory controller 802, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 800, memory controller 802, ROM 804, and RAM 806 are integrated onto a common module 814. In this implementation, ROM 804 is configured as a flash ROM that is connected to memory controller 802 via a PCI bus and a ROM bus (neither of which are shown). RAM 806 is configured as multiple Double Data Rate Synchronous Dynamic RAM (DDR SDRAM) modules that are independently controlled by memory controller 802 via separate buses (not shown). Hard disk drive 808 and portable media drive 706 are shown connected to the memory controller 802 via the PCI bus and an AT Attachment (ATA) bus 816. However, in other implementations, dedicated data bus structures of different types can also be applied in the alternative.

A three-dimensional graphics processing unit 820 and a video encoder 822 form a video processing pipeline for high speed and high resolution (e.g., High Definition) graphics processing. Data are carried from graphics processing unit 820 to video encoder 822 via a digital video bus (not shown). An audio processing unit 824 and an audio codec (coder/decoder) 826 form a corresponding audio processing pipeline for multi-channel audio processing of various digital audio formats. Audio data are carried between audio processing unit 824 and audio codec 826 via a communication link (not shown). The video and audio processing pipelines output data to an A/V (audio/video) port 828 for transmission to a television or other display. In the illustrated implementation, video and audio processing components 820-828 are mounted on module 814.

FIG. 18 shows module 814 including a USB host controller 830 and a network interface 832. USB host controller 830 is in communication with CPU 800 and memory controller 802 via a bus (e.g., PCI bus) and serves as host for peripheral controllers 100(1)-100(4). Network interface 832 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 18, console 702 includes a controller support subassembly 840 for supporting four controllers 100(1)-100(2). The controller support subassembly 840 includes any hardware and software components needed to support wired and wireless operation with an external control device, such as for example, a media and game controller. A front panel I/O subassembly 842 supports the multiple functionalities of power button 712, the eject button 714, as well as any LEDs (light emitting diodes) or other indicators exposed on the outer surface of console 702. Subassemblies 840 and 842 are in communication with module 814 via one or more cable assemblies 844. In other implementations, console 702 can include additional controller subassemblies. The illustrated implementation also shows an optical I/O interface 835 that is configured to send and receive signals that can be communicated to module 814.

MUs 740(1) and 740(2) are illustrated as being connectable to MU ports "A" 730(1) and "B" 730(2) respectively. Additional MUs (e.g., MUs 740(3)-740(6)) are illustrated as being connectable to controllers 100(1) and 100(3), i.e., two MUs for each controller. Controllers 100(2) and 100(4) can also be configured to receive MUs (not shown). Each MU 740 offers additional storage on which games, game parameters, and other data may be stored. In some implementations, the other data can include any of a digital game component, an executable gaming application, an instruction set for expanding a gaming application, and a media file. When inserted into console 702 or a controller, MU 740 can be accessed by memory controller 802.

A system power supply module 850 provides power to the components of gaming system 700. A fan 852 cools the circuitry within console 802.

An application 860 comprising machine instructions is stored on hard disk drive 808. When console 702 is powered on, various portions of application 860 are loaded into RAM 806, and/or caches 810 and 812, for execution on CPU 800, wherein application 860 is one such example. Various applications can be stored on hard disk drive 808 for execution on CPU 800.

Gaming and media system 800 may be operated as a standalone system by simply connecting the system to monitor 750 (FIG. 17), a television, a video projector, or other display device. In this standalone mode, gaming and media system 700 enables one or more players to play games, or enjoy digital media, e.g., by watching movies, or listening to music. However, with the integration of broadband connectivity made available through network interface 832, gaming and media system 700 may further be operated as a participant in a larger network gaming community.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the claimed subject matter be defined by the claims appended hereto.

What is claimed is:

1. A controller, comprising:
   a body having an upper surface; and
   an input mechanism coupled to the body and having an actuation surface for receiving manual user input, the actuation surface being rotatable about a central axis and including an input arm and a fill tab, the central axis intersecting the actuation surface and the upper surface of the body;
   wherein rotational movement of the actuation surface about the central axis changes a distance in a direction along the central axis between an upper surface of the input arm and an upper surface of the fill tab.

2. A controller according to claim 1, wherein:
   the actuation surface is rotatable between at least a first rotatable position and a second rotatable position, the actuation surface having a first surface topology in the first rotatable position and a second surface topology in the second rotatable position.

3. A controller according to claim 1, wherein:
   the input arm is a first input arm and the fill tab is a first fill tab;
   the actuation surface includes an upper surface of an input pad having a plurality of input arms including the first input arm and an upper surface of a fill pad including a plurality of fill tabs including the first fill tab, the upper surface of the input pad having a fixed shape configuration relative to the body in a first rotatable position and a second rotatable position.

4. A controller according to claim 1, wherein:
   the input mechanism has a fixed location relative to the body when the actuation surface is in a first rotatable position and a second rotatable position.

5. A controller according to claim 1, wherein:
   the input arm is a first input arm and the fill tab is a first fill tab;
   the input mechanism includes an input pad having a plurality of input arms with an upper surface and a fill pad having a plurality of fill tabs with an upper surface, the plurality of input arms includes the first input arm and the plurality of fill tabs includes the first fill tab; and
   the upper surfaces of the input arms are separated from the upper surfaces of the fill tabs by a first distance when the actuation surface is in a first rotatable position and by a different distance when the actuation surface is in a second rotatable position.

6. A controller according to claim 5, wherein:
   the input mechanism includes a base coupled to the body;
   the input pad is coupled to the base to permit rotational movement relative to the base about the central axis, the central axis extending through a central region of the base and intersecting a central region of the actuation surface; and the fill pad is coupled to the base to permit rotational movement relative to the base about the central axis, wherein the rotational movement about the central axis causes linear movement of the fill pad relative to the base along the central axis.

7. A controller according to claim 6, wherein:
the base includes a cam, the fill pad being coupled to the base using the cam;
wherein rotational movement of the fill pad about the central axis causes rotational movement along the cam and resultant linear movement of the fill pad along the central axis.

8. A controller according to claim 7, wherein:
the upper surfaces of the input arms are at a fixed height relative to the base;
the upper surfaces of the fill tabs are at a first height relative to the base when the actuation surface is in the first rotatable position and are at a second height relative to the base when the actuation surface is in the second rotatable position;
the first distance corresponding to a difference between the first height and the fixed height; and
the different distance corresponding to a difference between the second height and the fixed height.

9. A controller according to claim 5, wherein:
the input mechanism includes a base coupled to the body;
the fill pad is coupled to the base to permit rotational movement relative to the base about the central axis while inhibiting linear movement relative to the base along the central axis, the central axis extending through a central region of the base and intersecting a central region of the actuation surface; and
the input pad is coupled to the base to permit rotational movement relative to the base about the central axis, wherein the rotational movement about the central axis causes linear movement of the input pad relative to the base along the central axis.

10. A controller according to claim 5, wherein the different distance is zero.

11. A controller according to claim 5, wherein:
the actuation surface is rotatable in a first direction from the first rotatable position to the second rotatable position;
the actuation surface is rotatable in the first direction from the second rotatable position to the first rotatable position; and
the actuation surface is rotatable in a second direction opposite to the first direction from the second rotatable position to the first rotatable position.

12. A controller according to claim 1, wherein the input mechanism is a directional pad.

13. A controller, comprising:
a body having an upper surface; and
an input mechanism coupled to the body for receiving manual user input, the input mechanism having an actuation surface that includes an upper surface of a plurality of input arms and an upper surface of a plurality of fill tabs, the actuation surface is rotatable between a first rotatable position and a second rotatable position;
wherein the upper surfaces of the input arms are separated from the upper surfaces of the fill tabs by a first vertical distance relative to the upper surface of the body when the actuation surface is in the first rotatable position and by a different vertical distance relative to the upper surface of the body when the actuation surface is in the second rotatable position.

14. A controller according to claim 13, wherein the input mechanism comprises:
a base coupled to the body;
an input pad including the plurality of input arms, the input pad configured for rotational movement about the base, the upper surfaces of the input arms having a fixed height relative to the base; and
a fill pad including the plurality of fill tabs, the fill pad configured for rotational movement about the base and linear movement along an axis perpendicular to the actuation surface;
wherein rotational movement of the fill pad from the first rotatable position to the second rotatable position causes linear movement of the fill pad, the upper surfaces of the input arms being separated from the upper surfaces of the fill tabs by a first amount when the fill pad is in the first rotatable position to define a first topology of the actuation surface and by a different amount when the fill pad is in the second rotatable position to define a second topology of the actuation surface.

15. A controller according to claim 13, wherein:
the input arms are first input buttons corresponding to a first set of ordinate directions; and
the tabs are second input buttons corresponding to a second set of ordinate directions.

16. A hand-held game controller, comprising:
a body; and
a directional pad assembly accessible at a face of the body, the directional pad assembly having a rotatable actuation surface including:
an input pad including a plurality of arm members having an upper surface, and
a fill pad including a plurality of fill tabs having an upper surface, the plurality of fill tabs configured for linear movement relative to the upper surfaces of the arm members;
wherein rotation of the fill pad relative to the face of the body causes the linear movement of the plurality of fill tabs to change a vertical distance relative to the face of the body between the upper surfaces of the arm members and the upper surfaces of the fill tabs.

17. A hand-held game controller according to claim 16, wherein the directional pad assembly includes:
a circular base coupled to the body of the controller, the base having a cam engaging the fill pad;
wherein the fill pad rotates about the base according to the cam causing linear movement of the fill pad along an axis intersecting the face of the body.

18. A game controller according to claim 16, wherein:
rotation of the directional-pad assembly causes movement of the plurality of tabs from a first position defining a first distance between the upper surface of the plurality of tabs and the upper surface of the plurality of arm members and a second position defining a different distance between the upper surface of the plurality of tabs and the upper surface of the plurality of arm members;
the upper surface of the plurality of arm members and the upper surface of the plurality of tabs in the first position define a first topology of the actuation surface; and
the upper surface of the plurality of arm members and the upper surface of the plurality of tabs in the second position define a second topology of the actuation surface.

19. A controller according to claim 1, wherein the actuation surface is at a first height relative to the body in the first rotatable position and the second rotatable position.

20. A hand-held game controller, comprising:
- a body; and
- a directional pad assembly accessible at a face of the body, the directional pad assembly having a rotatable actuation surface including:
  - an input pad including a plurality of arm members having an upper surface, and
  - a fill pad including a plurality of fill tabs having an upper surface, the plurality of fill tabs configured for movement relative to the upper surfaces of the arm members;
- wherein rotation of the fill pad relative to the face of the body causes movement of the plurality of fill tabs to change a distance between the upper surfaces of the arm members and the upper surfaces of the fill tabs;
- wherein the actuation surface is at a first height in a first rotatable position before actuation;
- wherein the actuation surface is at a different height in the first rotatable position when actuated;
- wherein the actuation surface is at the first height in a second rotatable position before actuation; and
- wherein the actuation surface is at a different height in the second rotatable position when actuated.

\* \* \* \* \*